United States Patent [19]

Burwell

[11] 4,068,133

[45] Jan. 10, 1978

[54] SNOW AND SLEET DETECTOR

[75] Inventor: Garwood N. Burwell, Madison, N.J.

[73] Assignee: The Rails Company, Maplewood, N.J.

[21] Appl. No.: 726,172

[22] Filed: Sept. 24, 1976

[51] Int. Cl.² .......................................... H01H 83/00
[52] U.S. Cl. ................................ 307/116; 200/61.04; 340/234
[58] Field of Search ............... 307/116, 117, 118, 149; 200/61.04, 61.05, 61.06; 340/234, 235; 328/4; 244/134 R; 343/704; 307/149; 361/178; 219/201; 246/428

[56] References Cited

U.S. PATENT DOCUMENTS 2,787,695  4/1957  Dyke .............................. 340/234 X
3,157,800  12/1964  Burwell .............................. 307/116

Primary Examiner—Robert K. Schaefer
Assistant Examiner—Morris Ginsburg
Attorney, Agent, or Firm—Edward R. Weingram

[57] ABSTRACT

An improved snow and sleet detector having a pair of substantially parallel detector screens spaced one below the other, the upper screen being open to the ambient. A rim is included which is highly thermally conductive and electrically conductive and encompassing the upper screen proximate the edges thereof. A thermostatically controlled heater is mounted in intimate thermal and electrical contact with the rim for maintaining the rim and detector screens at a temperature high enough to melt snow or sleet falling thereon. Circuiting is described for providing an electrical indication when the detector screens are conductively coupled by melting snow or sleet.

10 Claims, 2 Drawing Figures

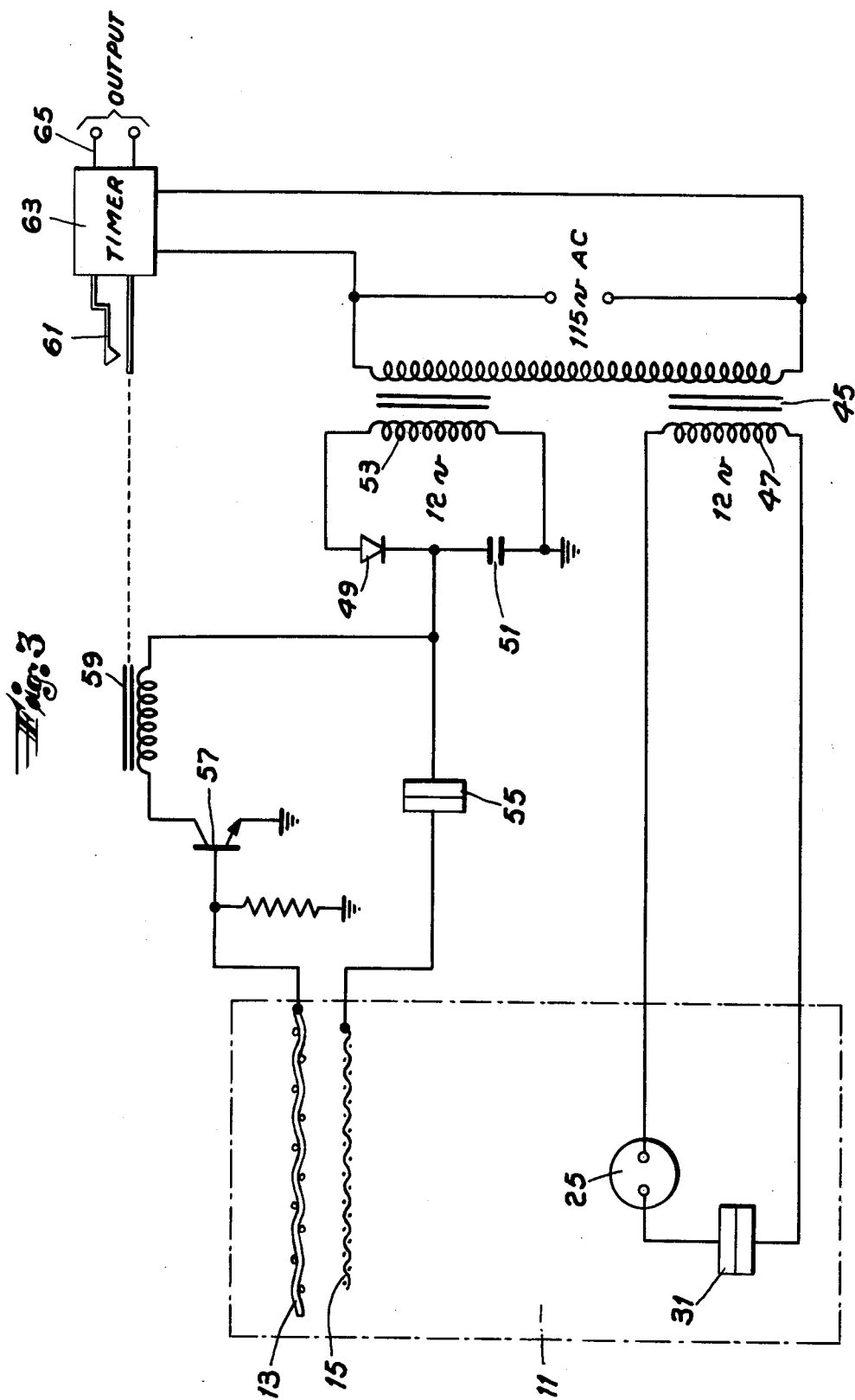

SNOW AND SLEET DETECTOR

BACKGROUND OF THE INVENTION

1. Field of the Invention

This invention relates generally to snow and sleet detectors and, more particularly to snow and sleet detectors having improved performance in wet snow conditions.

2. Description of the Prior Art

Detectors similar to that described in U.S. Pat. No. 3,157,800 issued to the applicant on Nov. 17, 1964, have proved useful in detecting snow and sleet conditions at locations such as railroad switches and electrically heatable sidewalks or ramps. The detectors can generate a remote indication of a potentially dangerous condition and/or actuate electrical heaters or other automatic safety equipment.

However, difficulties have been experienced in known snow and sleet detectors described in applicant's above-identified earlier patent, particularly in conditions of wet snow. Under such conditions the snow tends to stick to the rim of the detector and to bridge over the detector head thereby blocking further snowfall from reaching the detector mechanism. This has in some cases required the provision of a separate heater which clamps onto the top of the snow and sleet detector to prevent the buildup of such a snow bridge. But such heaters under many circumstances are completely unsuitable in some applications.

SUMMARY OF THE INVENTION

To reduce or avoid the problems set forth above, applicant provides an improved snow and sleet detector having a pair of parallel detecting screens spaced one below the other, the upper screen being open to the air, that includes a thermally conductive rim which encompasses the upper screen proximate the edge thereof. Heating means is provided mounted in intimate thermal contact with the rim for heating the rim to prevent the buildup of snow thereon. Means are further provided to mount the lower screen in spaced relationship with and thermally coupled to the heating means to melt snow or sleet falling on the detector screens. Aperture means allows the run off of water from the region under the screens and means are provided for making electrical connections to the screens and the heater means.

It is therefore an object of the invention to provide a snow and sleet detector having improved performance especially in conditions of wet snow.

It is another object of the invention to provide an improved snow and sleet detector which prevents the buildup of a blocking snow bridge over the detector head.

It is a further object of the invention to provide an improved snow and sleet detector which prevents the buildup of a blocking snow bridge over the detecting head of the snow and sleet detector without requiring a separate heater for the detector head.

Still another object of the present invention is to provide an improved snow and sleet detector having external parts heated by an internal heater to prevent interference with its operation by build ups of snow or ice.

Another object of the present invention is to provide an improved snow and sleet detector having improved reliability.

Still another object of the present invention is to provide an improved snow and sleet detector whose performance is unaffected by water from melting snow or ice or any other source.

Yet a further object of the present invention is to provide an improved snow and sleet detector having apertures in the housing thereof to allow for run off of water melting into the snow detector.

It is another object of the present invention to provide an improved snow and sleet detector which is relatively easy to install and service.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 3 is a schematic diagram of circuitry to operate the detector of FIG. 1.

DESCRIPTION OF THE PREFERRED EMBODIMENT

Figure 1:
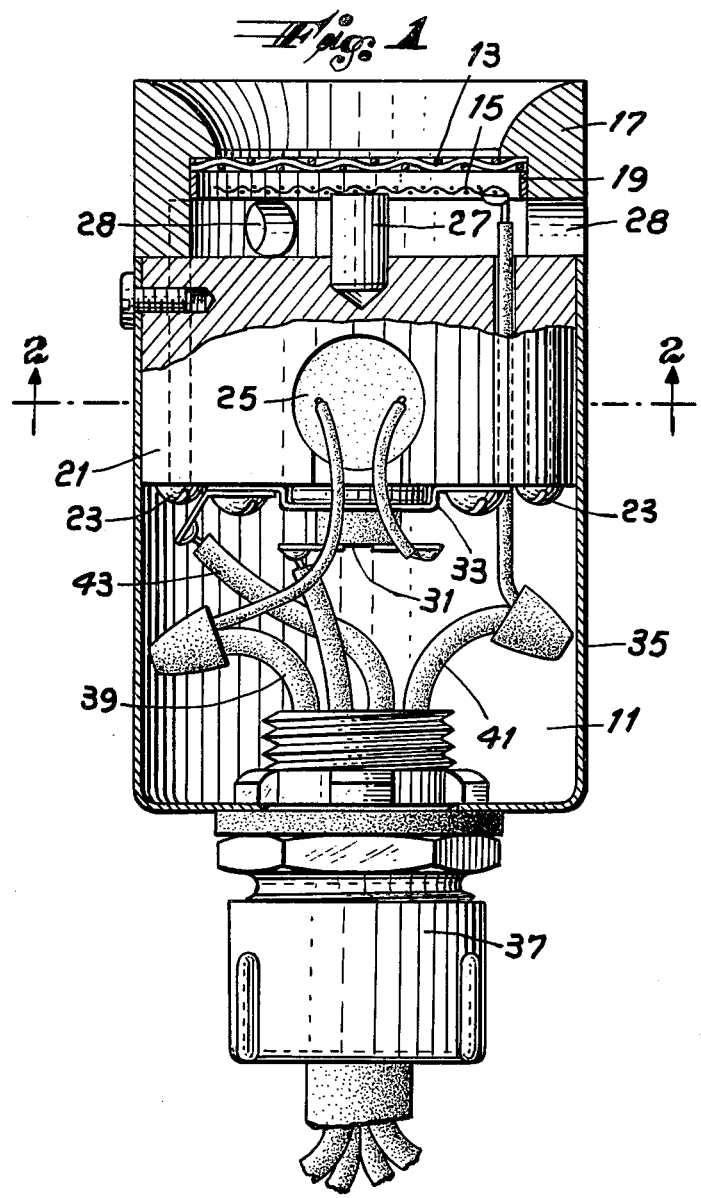
FIG. 1 is a side cut away view of a snow and sleet detector in accordance with a preferred embodiment of the invention.

Referring now to FIG. 1 of the drawings, the snow and sleet detector 11 according to a preferred embodiment of the invention includes upper detector screen 13 and a lower detector screen 15 mounted in spaced parallel relationship one below the other. The lower screen 15 is normally of relatively finer mesh than the upper screen 13.

The upper screen is mounted in the rim member 17, which is preferably formed of an electrically and thermally conductive material such as aluminum and which encompasses the upper screen 13 proximate the edge thereof, leaving the central portion exposed. An assembly ring 19 clamps the upper screen 13 within the rim member 17.

Figure 2:
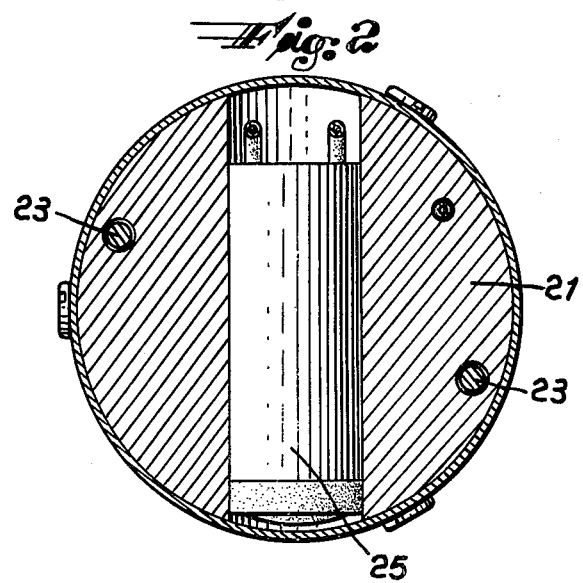
FIG. 2 is a sectional view of the detector of FIG. 1 showing the placement and structure of the heater.

The rim member 17 is mounted in intimate thermal contact with the heater support 21, which is preferably also formed of aluminum, by a pair of screws 23 which thread through the heater support 21 and into the rim member 17. A cylindrically-shaped electrical heater 25 is positioned in a corresponding cross hole in the heater support 21 as best seen in FIGS. 1 and 2.

An electrically insulating but preferably heat conducting standoff member 27, mounted in a hole in the top of the heater support 21, supports the lower screen 15 above the heater support 21 and in parallel proximity to the upper screen 13. The lower screen 15 may be fastened to the top of the standoff member 27 by glue or any other convenient means. The spacing between the upper and lower screens 13 and 15 is preferably between 1/32 and 6/32 inches. Apertures 28 allow melted snow or sleet to run off from the region between the lower screen 15 and the top of the heater support 21.

A thermostat 31 controlling the operation of the heater 25 is mounted against the bottom surface of the heater support 21 by a bracket 33. The thermostat 31 is set to maintain the heater 25 and heater support block 21 at a temperature sufficiently high to melt any snow or sleet falling on the rim member 17 or on the screens 13 and 15. The lower portion of the detector 11 is enclosed by a container 35.

Electrical connections to the elements of the detector 11 are made from the bottom of the detector 11 by means of the feed-through connector 37. The heater 25 and thermostat 31 are connected in series with wire pair 39 while wire 41 is connected to the lower screen 15. Electrical connection is made to the upper screen 13 via the aluminum rim member 17 and the aluminum heater support 21 by means of wire 43.

Referring now to the schematic diagram of FIG. 3 of the drawings in conjunction with FIG. 1, power may be provided to operate the snow and sleet detector according to the invention from, for instance, a 115v line which may be connected to the primary of a step down transformer 45. The series connected thermostat 31 and heater 25 is connected across a first secondary winding 47. A rectifier circuit made up of a diode 49 connected in series with the capacitor 51 is connected across the second secondary winding 53 to provide DC powder to the detector circuit.

Snow or sleet falling on the upper detector screen 13 is melted by the action of the heater 25 and the resultant water bridges the gap between the upper and lower screens 13 and 15. Since such melted snow or ice generally has some conductivity, it couples the DC voltage present at the junction of the diode 49 and the capacitor 51 through the external thermostat 55 to the base of the common emitter connected transistor 57 thereby turning it on. When the transistor 57 becomes conductive the relay 59 connected in the collector circuit of transistor 57 is actuated causing the normally open relay contacts 61 to close thereby energizing the timer 63. The timer 63 may be powered from the 115v line.

The timer 63 may be of a well known motor driven or pneumatic type which provide a signal at the output terminals 65 for as long as transistor 57 is turned on by melted snow or sleet conductivity bridging the screens 13 and 15 and for a predetermined time thereafter. When the screens 13 and 15 are cleared of moisture, transistor 57 no longer receives base current and so is turned off. This deactuates the relay 59, thereby opening the contacts 61 which, in turn, causes the timer 63 to begin its run-off timing cycle. If, during the run-off cycle, further melted snow or sleet bridges the screens 13 and 15, turning the transistor 57 on, the timer 63 is initialized again and goes through the entire run-off cycle when the screens 13 and 15 are again cleared.

The thermostat 55 is connected in series between the junction of diode 49 and capacitor 51 and the lower screen 15. It is preferably set to be open at ambient temperatures above about 38° F. so that rainfall on days where no danger of freezing exists cannot cause spurious operation of the transistor 57.

It should be clear from the foregoing that the improved snow and sleet detector of the present invention has many desirable features. By heating the rim of the detector, the snow and ice that normally tend to accumulate on any exposed object during the periods of precipitation will be caused to melt so that the sensing screens will always be unincumbered and ready to sense when there is precipitation present.

The aperatures formed in the housing of the contained provide for the draining of any liquid that has entered the detector, either from melting snow or ice, or normal rainfall or from any other condition which cannot be anticipated.

The internal thermostat insures that the heated rim of the detector is always warm enough to insure proper operation of the device without requiring installation of the external heater.

The relatively simple construction of the snow and sleet detector, coupled with the design which prevents clogging or bridging over by snow and/or ice, and the ability to prevent accumulations of water within the detector, which might interfere with the operation of the device, make the device highly reliable in relation to other products in use.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. An improved snow and sleet detector having a pair of substantially parallel detector screens spaced one below the other, the upper screen being open to the ambient, comprising:
 a highly thermally conductive rim encompassing said upper screen proximate the edge thereof;
 heating means mounted at least partially internally in said detector in intimate thermal contact with said rim and spaced below said screens; and
 means for making electrical contact with said heating means and said screens.

2. The improved snow and sleet detector of claim 1 wherein said heating means comprises an electrical heater and a conductive metallic support encompassing said heater, said support being in intimate thermal and electrical contact with said rim.

3. The improved snow and sleet detector according to claim 2 wherein said heating means further comprises a thermostat for maintaining said support near a predetermined temperature for melting snow or sleet on said rim and said screens.

4. The improved snow and sleet detector according to claim 2 wherein said rim is formed of a conductive metal, said upper screen being in electrical contact with said rim and further including means connected to said support for making external electrical contact with said upper screen.

5. The improved snow and sleet detector of claim 2 further including stand-off means mounted on the upper portion of said support, the lower screen being attached to said stand-off means in parallel spaced relationship with said upper screen.

6. The improved snow and sleet detector of claim 4 further including means attached to said support for enclosing means including feed-through means for allowing external electrical connection to said screens and said heater.

7. The improved snow and sleet detector according to claim 1 further comprising:
 means connected with said rim for enclosing the portion of said detector opposite said screens; and
 aperture means for allowing run-off of water from below said screens.

8. The improved snow and sleet detector according to claim 7 wherein said heating means comprises an electrical heater and a conductive metallic support encompassing said heater, said support being in intimate thermal and electrical contact with said rim.

9. The improved snow and sleet detector according to claim 8 wherein said rim is formed of a conductive metal, said upper screen being in electrical contact with said rim and further including means connected to said support for making external electrical contact with said upper screen.

10. The improved snow and sleet detector according to claim 1 further comprising:
aperture means in said rim for allowing run-off of water from below said screens;
said heating means comprising:
an electrical heater;
a conductive metallic support encompassing said heater, said support being in intimate thermal and electrical contact with said rim;
a thermostat for maintaining said support near a predetermined temperature for melting snow or sleet on said rim and said screens;
said rim is formed of a conductive metal;
said upper screen being an electrical contact with said rim;
means connected to said support for making external electrical contact with said upper screen;
stand-off means mounted on the upper portion of said support;
the lower screen being attached to said stand-off means in parallel-spaced relationship with said upper screen; and
enclosing means including feed through means for allowing external electrical connection to said screens and said heater.

* * * * *